US008179317B2

(12) United States Patent
Seifer et al.

(10) Patent No.: US 8,179,317 B2
(45) Date of Patent: May 15, 2012

(54) METHOD AND APPARATUS FOR PASSIVE GEOLOCATION USING SYNTHETIC-APERTURE PROCESSING (75) Inventors: Arnold D. Seifer, Nashua, NH (US); Donald B. Spencer, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 303 days.

(21) Appl. No.: 12/584,688

(22) Filed: Sep. 10, 2009
(Under 37 CFR 1.47)

(65) Prior Publication Data
US 2011/0057839 A1  Mar. 10, 2011

(51) Int. Cl.
G01S 1/22 (2006.01)
G01S 5/28 (2006.01)

(52) U.S. Cl. ........................ 342/393; 342/451

(58) Field of Classification Search .............. 342/357.78, 342/393, 394, 450, 451, 463, 464; *G01S 1/22, G01S 5/28*
See application file for complete search history.

(56) References Cited

U.S. PATENT DOCUMENTS

| | | | | |
|---|---|---|---|---|
| 5,008,679 A | * | 4/1991 | Effland et al. | 342/353 |
| 6,018,312 A | * | 1/2000 | Haworth | 342/353 |
| 6,163,297 A | * | 12/2000 | Rose | 342/418 |
| 7,667,640 B2 | * | 2/2010 | Ho et al. | 342/357.21 |
| 2009/0278733 A1 | * | 11/2009 | Haworth | 342/357.01 |

FOREIGN PATENT DOCUMENTS

GB  2443226 A  *  4/2008

OTHER PUBLICATIONS

Proposal to the National Reconnaissance Office, Jul. 2002, 15 pages, BAE Systems, United States.

* cited by examiner

*Primary Examiner* — Thomas Tarcza
*Assistant Examiner* — John Vigushin
(74) *Attorney, Agent, or Firm* — Robert K. Tendler (57) ABSTRACT Using in-phase and quadrature components of a received signal, spatial and temporal information is utilized to generate a maximum likelihood coefficient from the measured data to geolocate an emitter of unknown frequency. In one embodiment an iso-Doppler contour is generated having regions of high correlation to estimate location in which the maximum likelihood calculation uses two factors, one derived from a single aperture and one derived from bearing estimates, with the region of highest correlation corresponding to emitter location. Hypothesized in-phase and quadrature signals corresponding to an emitter location describe what the signals received at the aperture should be if the emitter is of a predetermined frequency and at a predetermined location, with these estimates used in the maximum likelihood algorithm.

46 Claims, 5 Drawing Sheets

METHOD AND APPARATUS FOR PASSIVE GEOLOCATION USING SYNTHETIC-APERTURE PROCESSING

FIELD OF THE INVENTION

This invention relates to geolocation and more particularly to the use of both temporal and spatial information from in-phase and quadrature emitter signals to geolocate the emitter.

BACKGROUND OF THE INVENTION

For some time there has been a requirement to be able to locate the position of a radar emitter, especially in a hostile environment, and to be able to passively do so by overflying a theater and detecting emissions from the radar.

Presently, two conventional principles are used for locating the emitter, both relying on the emitter being a stationary point target. Direction-finding techniques exploit the spatial coherence of the electromagnetic radiation, where the airborne (or space-borne) platform possesses two or more spatially separated apertures, whose phase difference between their outputs determine the direction of propagation of the incident electromagnetic field, thus determining from whence it came. The change in direction of arrival over time as the surveillance receiving platform moves determines the location of the emitter by triangulation.

The second conventional method for geolocating a radar exploits Doppler shift, which assumes that the emitter is frequency stable. Assuming that the electromagnetic radiation from an emitter is detected by at least one aperture in the form of an antenna on a flying platform that overflies the emitter, motion of one's own platform or shift creates a Doppler shift versus time along the flight path. It has been found that one can determine the location of the emitter or at least its range based on the Doppler shift.

Such Doppler shift techniques are explained in an article entitled "Analysis of Single Platform Passive Emitter Location With Terrain Data," by Mark L. Fowler in IEEE Transactions On Aerospace and Electronic Systems, Vol. 37, No. 2, April 2001, and in U.S. Pat. No. 5,870,056 by Mark L. Fowler. Another Doppler triangulation transmitter location system is described in U.S. Pat. No. 5,874,918 by Steven V. Czarnecki, James A. Johnson, Clifford M. Gray, George VerWys and Carl Gerst.

It will be appreciated that all of the above Doppler-frequency techniques require that one know the frequency of the emitter so that one can perform the Doppler frequency calculations.

Note in the Czarnecki et al. patent, the frequency is measured by cross-correlating coherent pulses of the received frequency signal.

These systems are frequently referred to as frequency-difference-of-arrival systems or FDOA systems. In essence, what these systems do is perform a Fast Fourier Transform to be able to identify the frequency of the emitter.

The problem with current passive geolocation systems is that heretofore they have not been able to meet military standards of providing three-meter accuracy, at a 50-nmi range, with processing times of less than three seconds. Even with data taken over long intervals which provides a relatively long baseline, it is not presently possible with the techniques noted above to in any way meet the above requirement.

As will be discussed hereinafter, these emitters, be they pulse-Doppler radars or moving-target-indicator (MTI) radars, have not had sufficiently phase-coherent emissions to permit coherent processing of electromagnetic radiation from these radars.

Moreover, when one has tried to geolocate on such radars using the conventional techniques, the presence of noise and the limitations of aperture size affect the accuracy with which one can measure direction of arrival. Moreover, limitations in how accurately one can measure Doppler shift in the presence of noise prevents the required accuracy.

In general, the accuracy in terms of range for any of the prior geolocation systems is on the order of 10% of the actual range. Thus, for an emitter that is 50 kilometers away from an overflying aircraft, the best range measurements were on the order of 5 kilometers. In general this does not yield sufficiently accurate estimations of the position of the emitter to be able to countermeasure the emitter.

Thus, passively determining the range to an emitter from a single airborne or low earth orbit satellite surveillance platform has been problematic.

By way of further background, the more modern coherent radars tend to use a single ovenized crystal-controlled oscillator as a local time-frequency standard in order to achieve better performance in sub-clutter visibility. The term ovenized refers to a crystal-controlled oscillator whose quartz crystal is placed inside a temperature-controlled oven in order to enhance frequency stability and phase coherence. These oscillators are also used to improve Doppler resolution and in some cases are used in target identification.

Emissions from such radars tend, perhaps unintentionally, to be phase-coherent over periods of time extending to several tens or even hundreds of milliseconds. As will be seen, it is a finding of the subject invention that such phase coherence over hundreds of milliseconds is sufficient to improve geolocation accuracies by two orders of magnitude.

From the radar designers' perspective, modern radars are concerned with local oscillator phase coherence only over the round trip time of the transmitted radar pulse and the return of its echo, a duration on the order of several tens of microseconds to perhaps one millisecond. For suppression of strong, near-in-ground or sea clutter, good phase coherence over a few tens of microseconds has been found to be sufficient.

To radar designers, phase coherence and frequency stability are both separate and necessary specifications of local oscillator performance, with one spanning a time interval that is much different from the other. In their zeal for better radar performance by improving frequency stability and short-term phase coherence, radar designers have inadvertently created coherent radars possessing long-term phase coherence, even though they do not require it.

For example, any corruption of phase that occurs between the time that an echo is received from the last transmitted pulse and the time of transmission of the next pulse will not affect radar performance.

SUMMARY OF INVENTION

In-phase and quadrature components of a signal received from an emitter are used in geophysical location determination in which both spatial and temporal information are used in a maximum likelihood algorithm in which measured data are correlated with hypothetical data to produce an iso-Doppler contour having regions of high correlation to estimate location. The maximum likelihood algorithm uses two factors, one derived from a single aperture and the other derived from bearing estimates, with the region of highest correlation corresponding to emitter location. Emitter location ambiguity is solved by overlying the contour with an angle-of-arrival line, with the angle-of arrival line overlay of the contour uniquely specifying emitter location.

As part of the subject invention, it has been found that radar local oscillators that are frequency-controlled by ovenized quartz crystals provide sufficient long-term phase coherence so that one can passively and accurately locate these radars by synthetic aperture processing. In the subject system, which uses both spatial and temporal information, one is able to achieve three-meter accuracies at a 50-kilometer range for reasonable processing times, even as short as three seconds under certain conditions. Moreover, it has been found that these accuracies can be reliably achieved with 30-second processing times.

Having ascertained that modern radars possess more phase coherence than heretofore thought, it is possible to utilize this phase coherence in a synthetic aperture processing model to be able to geolocate a stationary emitter with better than two orders of magnitude than was heretofore possible.

Rather than using traditional Doppler processing, in the subject invention the in-phase and quadrature, I and Q components, of the received signal are utilized in an algorithm that takes into account both spatial and temporal information. In one embodiment this involves a maximum likelihood algorithm in which measured data are correlated with hypothetical data. The expression below estimates location using matched filter techniques.

$$L(\hat{x}, \hat{y}, \hat{\omega}) = \left| \sum_l \left( \hat{S}^*_{1l} Y_{1l} + \hat{S}^*_{2l} Y_{2l} + \hat{S}^*_{3l} Y_{3l} + \hat{S}^*_{4l} Y_{4l} \right) \right|^2 \quad (1)$$

where $Y_{kl}$ denotes the sample of complex envelope of signal plus noise taken from the kth onboard aperture and sampled at time $t_l$. The coordinates of the hypothesized emitter position are $(\hat{x},\hat{y})$, and $\hat{\omega}$ denotes the hypothesized radian frequency of the emitter transmissions. The signals from the hypothesized emitter used in the algorithm have the form $$\hat{S}_{kl} = e^{-i\hat{\omega}\left(t_l - \frac{\hat{R}_k(t_l)}{c}\right)} \quad (2)$$

where i denotes the imaginary unit, where c denotes the speed of light, and where $\hat{R}_k(t_l)$ denotes the range, at time $t_l$, of the kth onboard aperture from the hypothesized emitter coordinates. The received signal plus noise can be mathematically represented by $$Y_{kl} = S_{kl} + \eta_{kl} \quad (3)$$

where the $S_{kl}$ (without the circumflex "^") denote $$S_{kl} = e^{-i\omega\left(t_l - \frac{R_k(t_l)}{c}\right)} \quad (4)$$

where ω (without the circumflex "^") denotes the true value of the transmitted emitter radian frequency, where $R_k(t_l)$ (without the circumflex "^") denotes the range of the emitter true position from the kth aperture at time $t_l$, and where $\eta_{kl}$ in Equation 3 denotes the complex envelope of noise appropriately scaled in amplitude to achieve a specified value of signal-to-noise ratio. In the absence of receiver noise, and of any other sources of error, L in Equation 1 is maximum in value when the hypothesized parameters $\hat{x}$, $\hat{y}$, and $\hat{\omega}$ all take on their true values x, y, and ω, which are reflected in the received signal $Y_{kl}$.

Here "t" refers to temporal information relative to the emitter and "R" subsumes spatial information relating to the emitter.

It is noted that when I and Q components are used, one always obtains the amplitude and phase of the incoming signal in which, in the subject invention, the entire complex-valued analytic signal including the in-phase and quadrature components, are used in the geolocation process.

The subject system looks at the behavior of the entire analytic signal, both the in-phase and quadrature components, over the collection period of that signal onboard the moving platform. The moving platform permits an elongation of the baseline on which measurements are made and creates a synthetic aperture that is quite long.

It is noted that the signal from the radar need not be perfectly coherent, meaning phase-coherent, over the collection period as long as it is phase-coherent over sub-intervals of that collection period, for instance, for at least 20 milliseconds.

Assuming that a single aperture in terms of an antenna is placed on an aircraft that is traveling along a predetermined path, one can develop a long aperture, assuming that the antenna is sampled at time intervals which specify the distance that the aperture has traveled to be no more than half a wavelength. It is noted that over time, each of these elements receives a signal from a point source, namely the ground-based radar.

It can be shown that one can measure the curvature of the wave front of the wave that impinges upon the antenna because the synthetic aperture baseline is relatively long. By appropriately phase shifting the outputs of the antenna so that the outputs are in phase with the wave front, one can measure the curvature of the wave front and from that curvature derive the location of the emitter.

In short, by measuring the curvature, one can measure the range and the phase center of where the radiation is coming from.

This can be accomplished when one has in essence a number of spatially separated antenna elements of an array simultaneously measuring the wave front. Assuming that the wave front is generated by a sinusoidal source, one can determine the radius of curvature of that wave front and therefore the phase center, that being the location of the emitter.

Note that one can synthesize the response of a real antenna having a long baseline with a single antenna on a moving platform, assuming that the point source is perfectly periodic, namely, perfectly sinusoidal and under very tight phase control.

The above, of course, requires that one knows the frequency of the emitter. However, when one has an unknown frequency source that is frequency stable and phase coherent but yet of unknown frequency, one cannot achieve a unique solution for a spot on the ground. Thus, the maximum-likelihood estimator in Equation (1) does not give a unique location on the ground.

One of the ways in which the subject invention determines the exact location on the ground using Equation (1) is to generate a locus of likely points on the ground using maximum likelihood matched filter processing. One input to the processor is the hypothesized I and Q signals that one would expect at the aperture, given an emitter at a hypothesized, predetermined position on the ground for a given hypothesized frequency. One can therefore establish a matrix or manifold in which one can hypothesize, guess or estimate what the signals received at the aperture should be if the emitter is of a predetermined frequency and at a predetermined location.

In other words, what is done is that the ground is in essence divided up into a grid, in which at each point on the grid one generates a hypothesized propagation model. One then takes the measured data and correlates the measured data against the hypothesized data, with the emitter location being that point on the ground that gives the closest match.

One therefore can compare point by point the degree of correlation between the measured data and the hypothesized data. Since one of the variables in the hypothesized data is frequency, one does not, using this system, need to know the frequency of the emitter. One simply picks or hypothesizes one as a starting point. Then one picks for an emitter point, that point in which there is the highest degree of correlation.

If one were to do a Fast Fourier Transform with respect to frequency on each of the grid points $(\hat{x},\hat{y})$ to ascertain the maximum amplitude of the FFT result, then one could theoretically pick which of the points having a high enough correlation would be the point at which the emitter is located. However, this is computationally intense and impractical.

It will be appreciated that using the above matched filter technique, there is something called an iso-Doppler contour, which is the locus of possible emitter locations given that a correlation is high enough. In general, this iso-Doppler contour looks like a figure-8, with the center of the contour being the position of the aircraft or platform. Note that the highest correlation value indicates the emitter location. Calculating this exact point, as mentioned, is computationally complex.

How one can arrive at the emitter location with reduced computational complexity involves a moving antenna.

Because the antenna constituting the aperture carried by the aircraft is moving along a predetermined and known path, one can also use the output of the antenna to derive angle of arrival. By overlaying angle of arrival with the iso-Doppler contour, the intersection uniquely locates the emitter location. This technique confirms the location established by the highest correlation value.

It is noted that in order to obtain the curvature of the wave that impinges upon the line of travel of the aperture, one has to plot the phase of the signal that arrives at the aperture as a function of time. In order to establish the appropriate phase at each of the points of the aperture along the direction of travel, one has to have an exceptionally accurate oscillator at the moving platform. One also has to have extremely accurate position estimates of the position of the aperture at very precise times. These are derived by an on-board navigation packaging using GPS.

What is established by the above is that one uses a multiple hypothesis, maximum likelihood type of estimator to estimate the position of the emitter when the frequency is not known.

The above description works if the emitter is phase coherent over long periods of time. Phase coherence pulse to pulse is not sufficient. However, it has been found that modern radars have phase coherence way beyond the pulse-to-pulse interval, with a practical limit to the phase coherence for adequate results being at least on the order of 20 milliseconds.

Assuming that phase coherence of the emitter does not last indefinitely, in one embodiment, one takes more and more measurements of very short snippets called coherent process intervals. These intervals assume that there is phase coherence during the interval. In essence one does a correlation on each of these intervals and then averages the results. This is a much more accurate way of determining geolocation than taking the data over a very large collection interval and averaging it.

Even though one has a very short interval or snippet on which to do a coherent calculation, while one may have very broad ambiguity on the iso-Doppler contour from an individual snippet, a contour is nonetheless still generated. The more and more snippets processed, the more and more localized will be the iso-Doppler contour. Thus it turns out that, because the small section of information from a snippet is highly ambiguous, matches occur for a large number of different locations on the surface of the earth. However, when one obtains a large number of these snippets and processes them, one can take a very broadly ambiguous locus of points on the ground and narrow it with a large number of snippet intervals.

It has been found that with 10 to 20 seconds of processing, one can converge down to adequate range accuracies.

Specifically, even if one cannot obtain the accuracy in three seconds of processing, 30 seconds of processing provides sufficient narrowing of the iso-Doppler contour.

Coupling the narrowed iso-Doppler contour with angle of arrival information uniquely determines the emitter location, in one instance with two orders of magnitude better accuracy than heretofore possible.

In summary, using in-phase and quadrature components of a received signal, spatial and temporal information is utilized to generate a maximum likelihood coefficient from the measured data to geolocate an emitter of unknown frequency. In one embodiment an iso-Doppler contour is generated having regions of high correlation to estimate location in which the maximum likelihood calculation uses two factors, one derived from a single aperture and one derived from bearing estimates, with the region of highest correlation corresponding to emitter location. Hypothesized in-phase and quadrature signals corresponding to an emitter location describe what the signals received at the aperture should be if the emitter is of a predetermined frequency and at a predetermined location, with these estimates used in the maximum likelihood algorithm.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
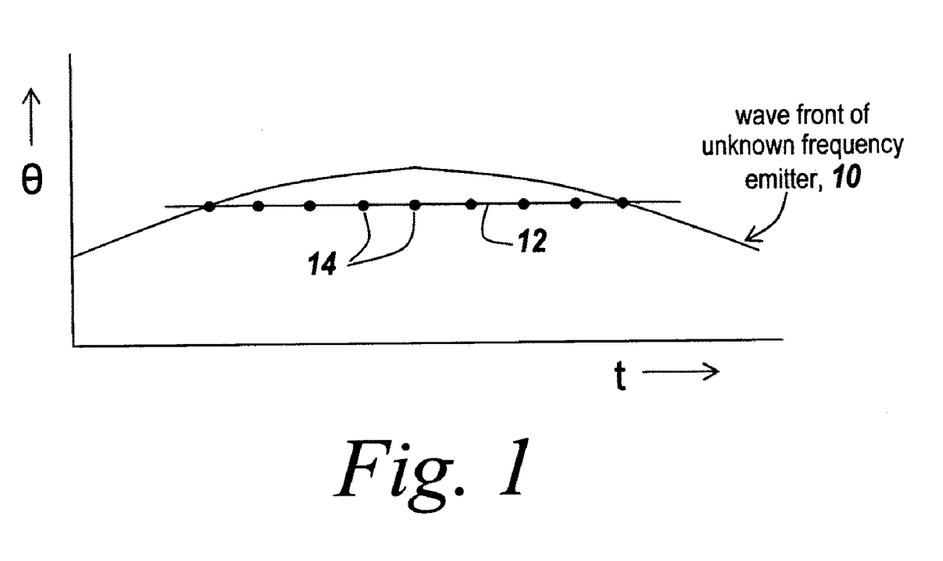
FIG. 1 is a diagrammatic representation of the wave front electromagnetic energy from an emitter on the ground as detected along the flight path of an aircraft, with the curvature of the wave front determining the geolocation of the emitter.

Referring now to the graph of FIG. 1, what is shown is the wave front 10 of an emitter of unknown frequency as it exists along a flight path 12 sampled at various aperture positions 14 along the flight path. By using I and Q processing, one can determine by the curvature of the wave front the exact phase-center location of the emitter and thus its geolocation.

Figure 2:
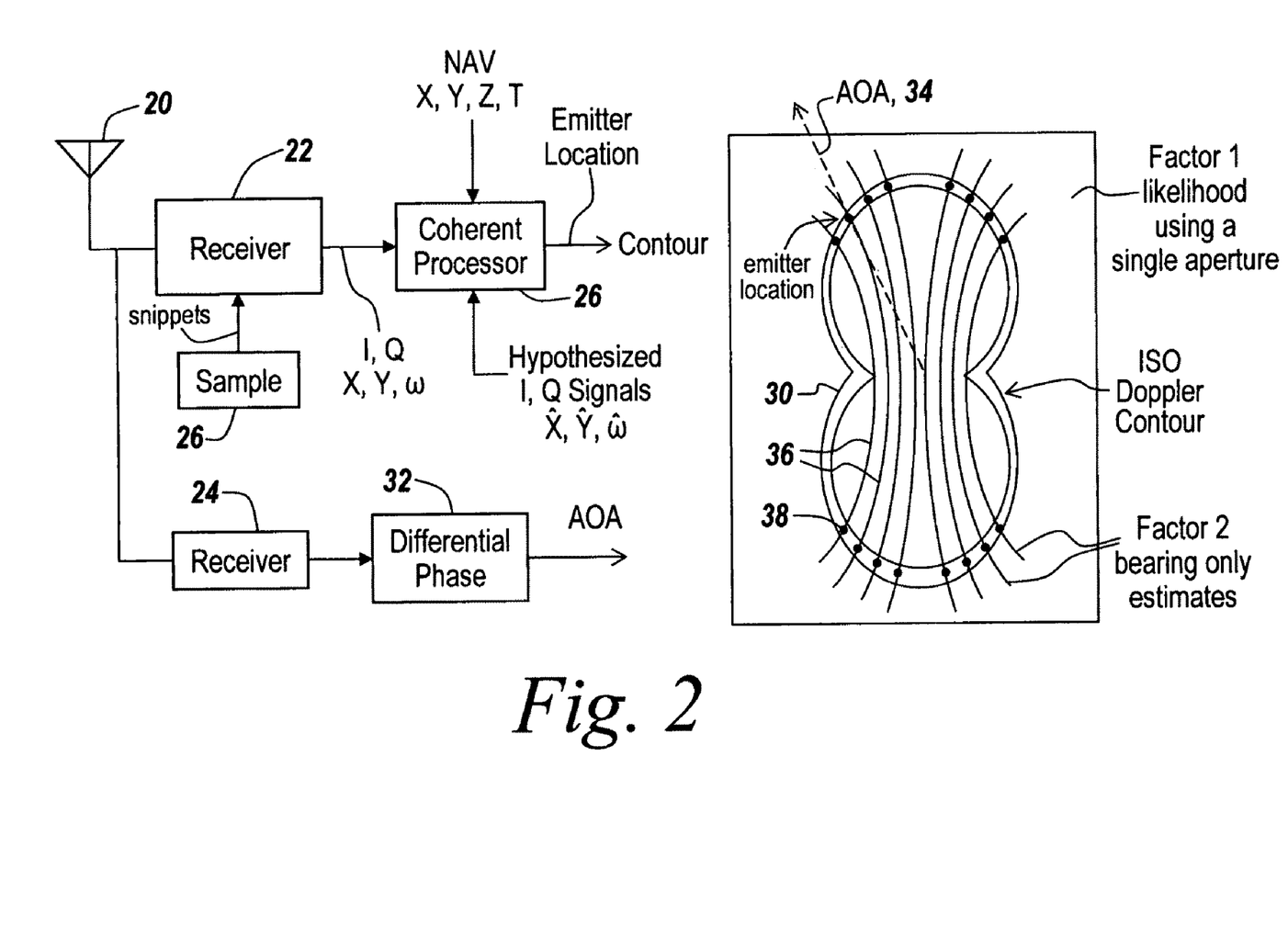
FIG. 2 is a block diagram of the subject geolocation system in which hypothetical values are compared with measured values, and an iso-Doppler contour is formed along with a representation of the angle of arrival of the signal from the emitter to establish the geolocation of the emitter, also indicating factors in the determination of the location likelihood.

How this is done in the subject invention is shown in FIG. 2, in which an antenna 20 is coupled to a receiver 22 and a receiver 24.

Receiver 22 is activated to sample the returns to form the aforementioned snippets by a sampling circuit 26. The output of the receiver consists of I and Q signals relating to the measured x, y coordinates of the emitter and its frequency. The calculator thus implements the processes described in Equations (1)-(6) herein.

These measured components are coupled to a coherent processor 26 that has an input hypothesized I and Q signals relating to estimated x, y, and ω).

The coherent processor calculates the emitter location in terms of an iso-Doppler contour, here illustrated at 30, which is the locus of emitter locations in terms of the likelihood using a single aperture.

The output of receiver 24 is coupled to a differential phase module 32, which outputs the detected angle of arrival of the incoming energy from the emitter, and this angle of arrival overlays the iso-Doppler contour 30 as illustrated at 34 such that the intersection of the angle of arrival line 34 with the iso-Doppler contour 30 unambiguously establishes the emitter location so that the required accuracies and calculation times are achieved.

Iso-Doppler contour is generated from likelihoods based on a single aperture with the lightened measure corresponding to maximum for hypothetical x and hypothetical y plotted geographically where the estimated values and the measured values correspond.

The iso-Doppler contour is also composed of likelihoods based on bearing-only estimates as illustrated by lines 36 such that the likelihood component 38 is composed of a likelihood in the iso-Doppler contour combined with a likelihood from the bearing-only estimates.

Figure 3:
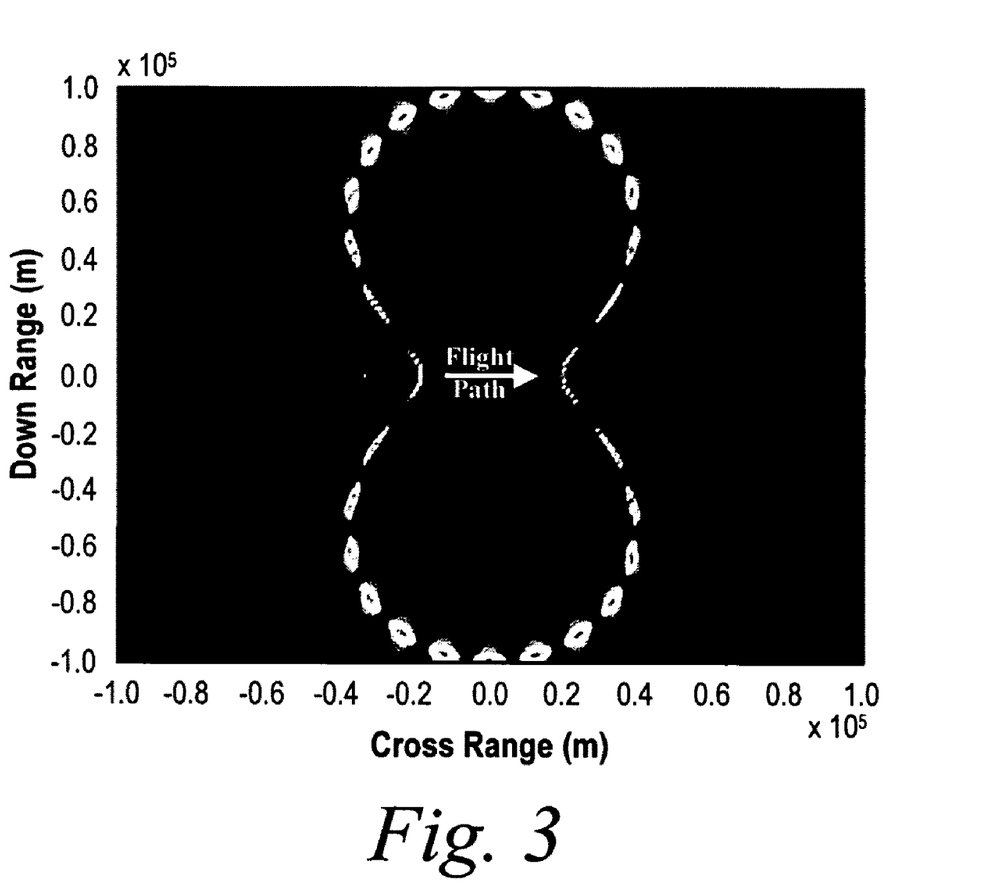
FIG. 3 is a computer-generated likelihood surface indicating the intensity of the indication, the likelihood that an emitter is at a particular geophysical location, with the figure-8 likelihood surface determined by two factors.

Referring to FIG. 3, a computer-generated composite likelihood contour is shown in which the enlarged and intense regions of the contour are a composite of the first and second factors, namely the likelihoods involving a single aperture and using bearing-only estimates.

Figure 4:
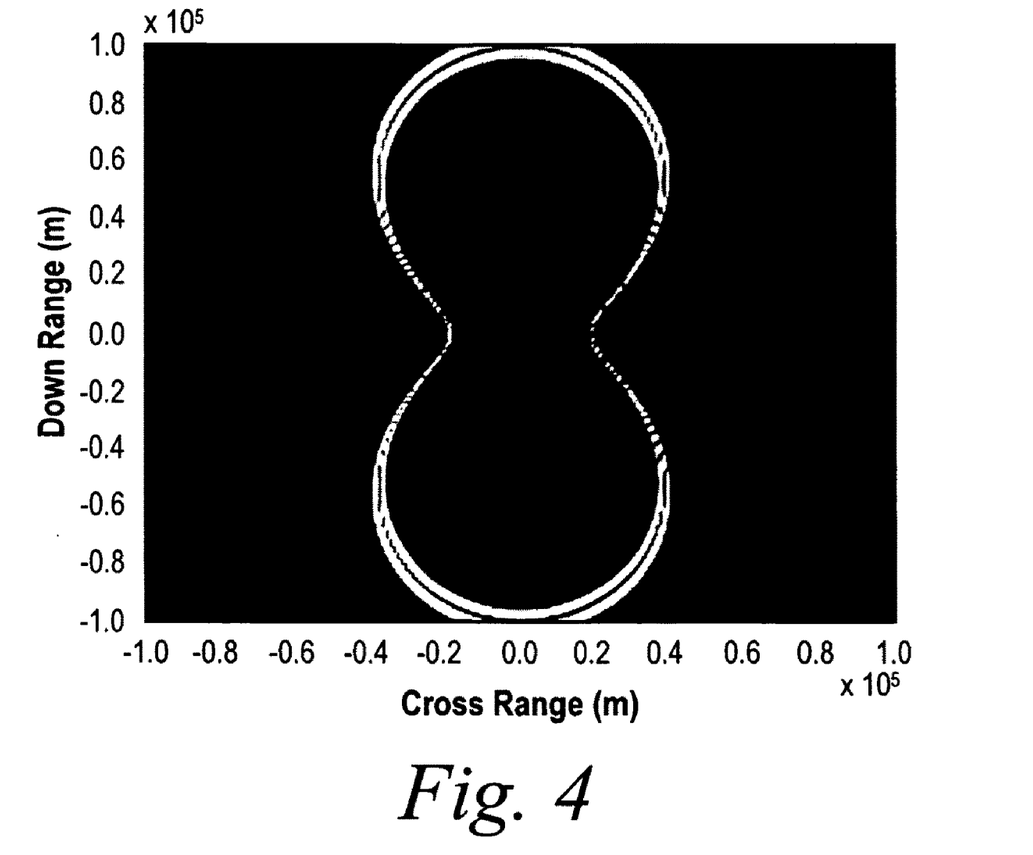
FIG. 4 is a likelihood surface corresponding to the first factor in which likelihood is determined utilizing a single aperture; and, FIG. 5 is a likelihood surface corresponding to the second factor in which bearing-only estimates are utilized.
Figure 5:
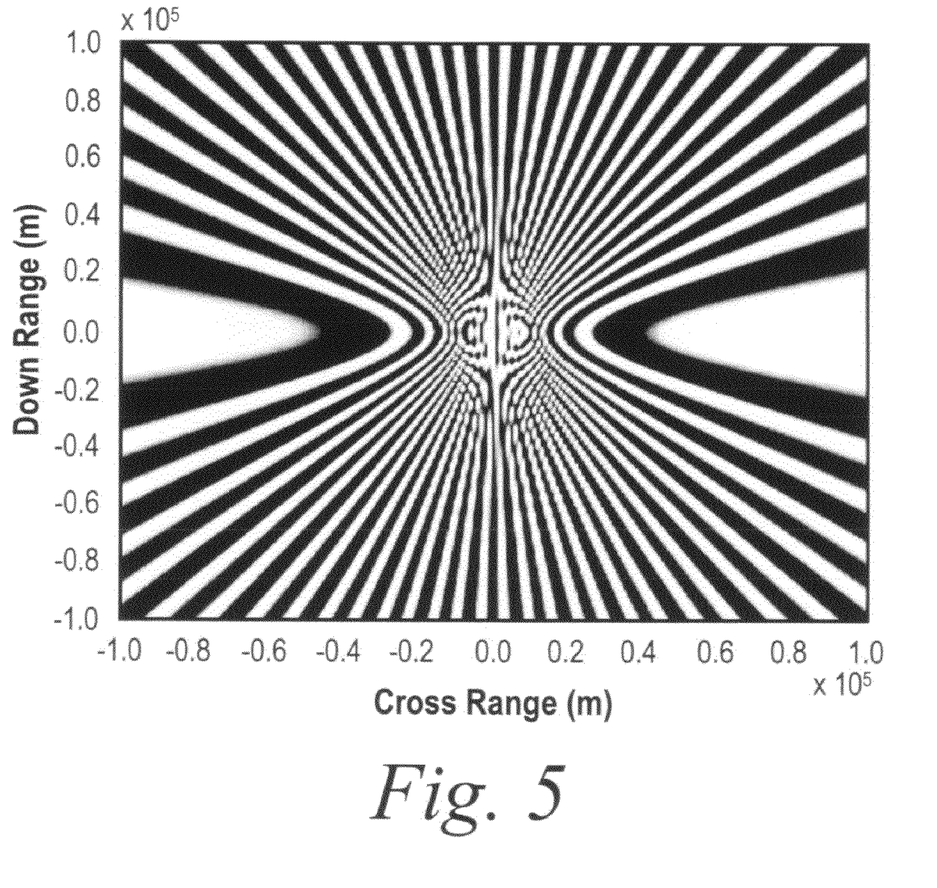

As can be seen from FIG. 4, the computer-generated contour shows the likelihoods in terms of those associated with a single aperture, whereas in FIG. 5 the bearing-only estimates likelihoods are generated. When these two estimates are overlain as illustrated in FIG. 3, one generates a composite likelihood contours, a maximum of which indicates the likely position of the emitter.

The composite likelihood of FIG. 3 has various ambiguities in it and the utilization of an angle-of-arrival overlay on this composite contour more unambiguously predicts the location of the emitter.

The equations that govern are as follows and describe two factors for generating a composite likelihood.

The equation for the Factor 1 likelihood computations is as follows:

$$L(x, y) \approx \max_{\omega} \left\{ \left| \sum_i \hat{S}_{1i}^* Y_{1i} \right|^2 \right\} \quad (5)$$

The equation for the Factor 2 likelihood is presented as follows:

$$x \left| \sum_i \left[ 1 + (\hat{S}_{2i}^* \hat{S}_{1i})(Y_{2i} Y_{1i}^*) + (\hat{S}_{3i}^* \hat{S}_{1i})(Y_{3i} Y_{1i}^*) + (\hat{S}_{4i}^* \hat{S}_{1i})(Y_{4i} Y_{1i}^*) \right] \right|^2 \right\} \quad (6)$$

It can be seen that Equation (5) defines likelihood utilizing only a single aperture, whereas Equation (6) utilizes bearing-only estimates.

Using the composite contour generated by Equations 5 and 6, one can determine from the highest correlation the location of the emitter. However, by overlaying this contour with angle of arrival, one can pick which of the high-correlation contour maxima is most likely the correct one.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for geolocating an emitter of unknown location and frequency, comprising the steps of:
    detecting in-phase and quadrature components of a received signal at an antenna that moves along a path;
    generating a maximum likelihood coefficient from the in-phase and quadrature components including generating an iso-Doppler contour having regions of high correlation, with the region of high correlation estimating geolocation by deriving maximum likelihood from a single aperture; and,
    geolocating the emitter utilizing the maximum likelihood coefficient, whereby spatial and temporal information is used to geolocate the emitter.

2. The method of claim 1, wherein the maximum likelihood is additionally derived from bearing estimates.

3. The method of claim 2, wherein the region of highest correlation corresponds to the highest maximum likelihood coefficient and designates emitter location.

4. The method of claim 1, wherein the step of detecting the in-phase and quadrature components of a signal from the emitter includes the steps of generating hypothetical in-phase and quadrature components for an emitter at a predetermined location on the earth operating at a predetermined frequency.

5. The method of claim 4, wherein the received signals are detected in different time intervals by the antenna at different positions along the path.

6. The method of claim 1, wherein the in-phase and quadrature components are analyzed over a collection period.

7. The method of claim 6, wherein the collection period has sub-intervals and wherein the sub-intervals are in the millisecond range.

8. The method of claim 1, wherein the maximum likelihood coefficient calculation includes the generation of a locus of likely points on the ground using maximum likelihood matched filter processing.

9. The method of claim 8, wherein the maximum likelihood matched filter processing includes hypothesizing in-phase and quadrature signals that one would expect at the antenna given an emitter at a hypothesized position on the ground for a given hypothesized frequency.

10. The method of claim 9, wherein the hypothesized positions on the ground are divided up into a grid in which at each point on the grid a hypothesized position model is generated.

11. The method of claim 10, wherein the detected in-phase and quadrature components are correlated against the hypothesized data, with the emitter location being that point on the ground that gives the closest match.

12. The method of claim 10 wherein the maximum likelihood coefficient calculation is performed by a Fast Fourier Transform with respect to frequency on each of the points on the grid to ascertain the maximum amplitude of the Fast Fourier Transform result.

13. A method for geolocating an emitter of unknown location and frequency, comprising the steps of:
   detecting in-phase and quadrature components of a received signal at an antenna that moves along a path;
   generating a maximum likelihood coefficient from the in-phase and quadrature components, the maximum likelihood coefficient being derived utilizing hypothesized in-phase and quadrature signals corresponding to an emitter location and the maximum likelihood coefficient being derived from comparing the hypothesized signals with detected signals, with the highest correlation between the two indicating emitter location; and,
   geolocating the emitter utilizing the maximum likelihood coefficient, whereby spatial and temporal information is used to geolocate the emitter.

14. The method of claim 13, wherein the hypothesized signals include signals expected from an emitter at a predetermined location and operating at a predetermined frequency.

15. A method for geolocating an emitter of unknown location and frequency, comprising the steps of:
   detecting in-phase and quadrature components of a received signal at an antenna that moves along a path;
   generating a maximum likelihood coefficient from the in-phase and quadrature components;
   geolocating the emitter utilizing the maximum likelihood coefficient, whereby spatial and temporal information is used to geolocate the emitter; and,
   detecting the angle of arrival of signals from the emitter and overlaying the angle-of-arrival line with an iso-Doppler contour.

16. A method for geolocating an emitter of unknown location and frequency, comprising the steps of:
   detecting in-phase and quadrature components of a received signal at an antenna that moves along a path;
   generating a maximum likelihood coefficient from the in-phase and quadrature components wherein the maximum likelihood coefficient utilizing hypothesized emitter positions is derived from:

$$L(\hat{x}, \hat{y}, \hat{\omega}) = \left| \sum_l \left( \hat{S}_{1l}^* Y_{1l} + \hat{S}_{2l}^* Y_{2l} + \hat{S}_{3l}^* Y_{3l} + \hat{S}_{4l}^* Y_{4l} \right) \right|^2$$

where $Y_{kl}$ denotes the sample of complex envelope of signal plus noise taken from the kth onboard aperture and sampled at time $t_l$ and where the coordinates of the hypothesized emitter position are $(\hat{x},\hat{y})$, and where $\hat{\omega}$ denotes the hypothesized radian frequency of the emitter transmissions; and,
   geolocating the emitter utilizing the maximum likelihood coefficient, whereby spatial and temporal information is used to geolocate the emitter.

17. The method of claim 16, wherein the signals from the hypothesized emitter have the form:

$$\hat{S}_{kl} = e^{-i\hat{\omega}\left(t_l - \frac{\hat{R}_k(t_l)}{c}\right)}$$

where i denotes the imaginary unit, where c denotes the speed of light, and where $\hat{R}_k(t_l)$ denotes the range, at time $t_l$, of the kth onboard aperture from the hypothesized emitter coordinates.

18. A method for geolocating an emitter of unknown location and frequency, comprising the steps of:
   detecting in-phase and quadrature components of a received signal at an antenna that moves along a path;
   generating a maximum likelihood coefficient from the in-phase and quadrature components; and,
   geolocating the emitter utilizing the maximum likelihood coefficient, whereby spatial and temporal information is used to geolocate the emitter, wherein the maximum likelihood coefficient calculation includes the generation of a locus of likely points on the ground using maximum likelihood matched filter processing, the matched filter processing including generating an iso-Doppler contour corresponding to the locus of possible emitter locations having a correlation exceeding a predetermined high correlation, thus to arrive at emitter location with reduced computational complexity.

19. The method of claim 18, wherein computational complexity is reduced by overlaying the angle of arrival of signals from the emitter with the iso-Doppler contour, with the intersection uniquely locating the emitter, thus to confirm the emitter location established by the highest correlation value.

20. The method of claim 18, wherein the maximum likelihood coefficient calculation assumes phase coherence of the emitter at least over a short coherent processing interval.

21. The method of claim 20, wherein a number of coherent processing intervals are averaged to obtain the measured in-phase and quadrature components.

22. The method of claim 21, wherein the coherent process intervals utilized results in geolocation converging down to adequate range accuracies within three seconds.

23. The method of claim 22, wherein if range accuracy below a predetermined number is not achieved in three seconds, no more than 30 seconds of processing provides narrowing of the iso-Doppler contour to below a second predetermined range accuracy number.

24. A system for geolocating an emitter of unknown location and frequency, comprising:
   a receiver detecting in-phase and quadrature components of a received signal at an antenna that moves along a path;
   a computer for generating a maximum likelihood coefficient from the in-phase and quadrature components, the maximum likelihood coefficient including an iso-Doppler contour having regions of high correlation, with the region of high correlation estimating geolocation, the maximum likelihood calculation used to generate the maximum likelihood coefficient including the maximum likelihood derived from a single aperture; and,
   a geolocation engine for geolocating the emitter utilizing the maximum likelihood coefficient, whereby spatial and temporal information is used to geolocate the emitter.

25. The system of claim 24, wherein the maximum likelihood is additionally derived from bearing estimates.

26. The system of claim 25, wherein the region of highest correlation corresponds to the highest maximum likelihood coefficient and designates emitter location.

27. The system of claim 24, and further including a detector for detecting the angle of arrival of signals from the emitter and overlaying the angle-of-arrival line with an iso-Doppler contour.

28. The system of claim 24, wherein the receiver for detecting the in-phase and quadrature components of a signal from the emitter includes a generator for hypothetical in-phase and quadrature components for an emitter at a predetermined location on the earth operating at a predetermined frequency.

29. The system of claim 28, wherein the received signals are detected in different time intervals by the antenna at different positions along the path.

30. The system of claim 24, wherein the in-phase and quadrature components are analyzed over a collection period.

31. The system of claim 30, wherein the collection period has sub-intervals and wherein the sub-intervals are in the millisecond range.

32. The system of claim 24, wherein the maximum likelihood coefficient calculation includes the generation of a locus of likely points on the ground using maximum likelihood matched filter processing.

33. The system of claim 32, wherein the maximum likelihood matched filter processing includes hypothesizing in-phase and quadrature signals that one would expect at the antenna given an emitter at a hypothesized position on the ground for a given hypothesized frequency.

34. The system of claim 33, wherein the hypothesized positions on the ground are divided up into a grid in which at each point on the grid a hypothesized position model is generated.

35. The system of claim 34, wherein the detected in-phase and quadrature components are correlated against the hypothesized data, with the emitter location being that point on the ground that gives the closest match.

36. The system of claim 34, wherein the maximum likelihood coefficient calculation is performed by a Fast Fourier Transform with respect to frequency on each of the points on the grid to ascertain the maximum amplitude of the Fast Fourier Transform result.

37. A system for geolocating an emitter of unknown location and frequency, comprising:
   a receiver detecting in-phase and quadrature components of a received signal at an antenna that moves along a path;
   a computer for generating a maximum likelihood coefficient from the in-phase and quadrature components, the maximum likelihood coefficient being derived utilizing hypothesized in-phase and quadrature signals corresponding to an emitter location, the maximum likelihood coefficient being derived from comparing the hypothesized signals with detected signals, with the highest correlation between the two indicating emitter location; and,
   a geolocation engine for geolocating the emitter utilizing the maximum likelihood coefficient, whereby spatial and temporal information is used to geolocate the emitter.

38. The system of claim 37, wherein the hypothesized signals include signals expected from an emitter at a predetermined location and operating at a predetermined frequency.

39. A system for geolocating an emitter of unknown location and frequency, comprising:
   a receiver detecting in-phase and quadrature components of a received signal at an antenna that moves along a path;
   a computer for generating a maximum likelihood coefficient from the in-phase and quadrature components; and,
   a geolocation engine for geolocating the emitter utilizing the maximum likelihood coefficient, whereby spatial and temporal information is used to geolocate the emitter, the maximum likelihood coefficient utilizing hypothesized emitter positions derived from:

$$L(\hat{x}, \hat{y}, \hat{\omega}) = \left| \sum_l (\hat{S}^*_{1l} Y_{1l} + \hat{S}^*_{2l} Y_{2l} + \hat{S}^*_{3l} Y_{3l} + \hat{S}^*_{4l} Y_{4l}) \right|^2$$

where $Y_{kl}$ denotes the sample of complex envelope of signal plus noise taken from the kth onboard aperture and sampled at time $t_l$ and where the coordinates of the hypothesized emitter position are $(\hat{x}, \hat{y})$, and where $\hat{\omega}$ denotes the hypothesized radian frequency of the emitter transmissions.

40. The system of claim 39, wherein the signals from the hypothesized emitter have the form:

$$\hat{S}_{kl} = e^{-i\hat{\omega}\left(t_l - \frac{\hat{R}_k(t_l)}{c}\right)}$$

where i denotes the imaginary unit, where c denotes the speed of light, and where $\hat{R}_k(t_l)$ denotes the range, at time $t_l$, of the kth onboard aperture from the hypothesized emitter coordinates.

41. A system for geolocating an emitter of unknown location and frequency, comprising:
   a receiver detecting in-phase and quadrature components of a received signal at an antenna that moves along a path;
   a computer for generating a maximum likelihood coefficient from the in-phase and quadrature components, the maximum likelihood coefficient calculation including the generation of a locus of likely points on the ground using maximum likelihood matched filter processing, the matched filter processing including generating a computational element for an iso-Doppler contour corresponding to the locus of possible emitter locations having a correlation exceeding a predetermined high correlation, thus to arrive at emitter location with reduced computational complexity; and,
   a geolocation engine for geolocating the emitter utilizing the maximum likelihood coefficient, whereby spatial and temporal information is used to geolocate the emitter.

42. The system of claim 41, wherein computational complexity is reduced by overlaying the angle of arrival of signals from the emitter with the iso-Doppler contour, with the intersection uniquely locating the emitter, thus to confirm the emitter location established by the highest correlation value.

43. The system of claim 41, wherein the maximum likelihood coefficient calculation assumes phase coherence of the emitter at least over a short coherent processing interval.

44. The system of claim 43, wherein a number of coherent processing intervals are averaged to obtain the measured in-phase and quadrature components.

45. The system of claim 44, wherein the coherent process intervals utilized results in geolocation converging down to adequate range accuracies within three seconds.

46. The system of claim 45, wherein if range accuracy below a predetermined number is not achieved in three seconds, no more than 30 seconds of processing provides narrowing of the iso-Doppler contour to below a second predetermined range accuracy number.

* * * * *